United States Patent
Smith et al.

(10) Patent No.: US 6,777,462 B2
(45) Date of Patent: Aug. 17, 2004

(54) INK COMPOSITIONS CONTAINING SODIUM TETRAPHENYLBORIDE

(75) Inventors: Thomas W. Smith, Penfield, NY (US); Richard L. Colt, Rochester, NY (US); Kathleen M. McGrane, Webster, NY (US); Hiep Ly, Webster, NY (US)

(73) Assignee: Xerox Corporation, Stamford, CT (US)

( * ) Notice: Subject to any disclaimer, the term of this patent is extended or adjusted under 35 U.S.C. 154(b) by 263 days.

(21) Appl. No.: 09/990,375

(22) Filed: Nov. 23, 2001

(65) Prior Publication Data

US 2003/0130374 A1 Jul. 10, 2003

(51) Int. Cl.⁷ .......................... C09D 11/10; C08K 3/38; C08L 39/00; C08L 39/02; C08L 39/06
(52) U.S. Cl. ................ 523/160; 524/404; 524/548; 524/555; 524/567
(58) Field of Search ................ 523/160, 161; 524/404, 548, 555, 567; 526/263, 264; 106/31.27, 31.28, 31.6

(56) References Cited

U.S. PATENT DOCUMENTS

| 4,410,364 | A | * | 10/1983 | Finlayson et al. ......... 106/31.6 |
| 4,705,567 | A | * | 11/1987 | Hair et al. ................ 106/31.43 |
| 5,198,023 | A | * | 3/1993 | Stoffel .................... 106/31.32 |
| 5,723,179 | A | * | 3/1998 | Wong et al. ................ 427/258 |
| 5,801,738 | A | * | 9/1998 | Stoffel et al. ............... 347/100 |
| 5,990,198 | A | | 11/1999 | Schwarz, Jr. .............. 523/160 |
| 6,001,899 | A | | 12/1999 | Gundlach et al. ........... 523/160 |
| 6,005,022 | A | * | 12/1999 | Schwarz, Jr. .............. 523/160 |
| 6,054,505 | A | | 4/2000 | Gundlach et al. ........... 523/160 |
| 6,086,197 | A | * | 7/2000 | Kubota et al. ................ 347/96 |
| 6,142,618 | A | | 11/2000 | Smith et al. .................. 347/85 |
| 6,174,355 | B1 | | 1/2001 | Mayo et al. ............. 106/31.43 |
| 6,258,873 | B1 | | 7/2001 | Gundlach et al. ........... 523/160 |
| 6,270,214 | B1 | | 8/2001 | Smith et al. ................ 347/101 |
| 6,274,645 | B1 | | 8/2001 | Gundlach et al. ........... 523/160 |
| 6,281,269 | B1 | * | 8/2001 | Schut ........................ 523/160 |

* cited by examiner

*Primary Examiner*—Callie Shosho
(74) *Attorney, Agent, or Firm*—Judith L. Byorick

(57) ABSTRACT

Disclosed is an ink composition comprising water, a colorant, and sodium tetraphenylboride. Another embodiment of the present invention is directed to a set of inks for printing multicolor images in an ink jet printer, the ink set comprising (1) a first ink having a first color and comprising water, a first colorant, and at least one of (a) a cationic polymer, (b) a cationic surfactant, or (c) an inorganic salt the cation of which has a tetraphenylboride salt that is substantially insoluble in water, and (2) a second ink having a second color different from the first color and comprising water, a second colorant, and sodium tetraphenylboride, wherein intercolor bleed between the first ink and the second ink is reduced when the second ink is printed adjacent to, on top of, or underneath the first ink on a print substrate.

21 Claims, No Drawings

INK COMPOSITIONS CONTAINING SODIUM TETRAPHENYLBORIDE

BACKGROUND OF THE INVENTION

The present invention is directed to aqueous ink compositions. More specifically, the present invention is directed to inks particularly suitable for use in ink jet printing processes. One embodiment of the present invention is directed to an ink composition comprising water, a colorant, and sodium tetraphenylboride. Another embodiment of the present invention is directed to a set of inks for printing multicolor images in an ink jet printer, said ink set comprising (1) a first ink having a first color and comprising water, a first colorant, and at least one of (a) a cationic polymer, (b) a cationic surfactant, or (c) an inorganic salt the cation of which has a tetraphenylboride salt that is substantially insoluble in water; and (2) a second ink having a second color different from the first color and comprising water, a second colorant, and sodium tetraphenylboride, wherein intercolor bleed between the first ink and the second ink is reduced when the second ink is printed adjacent to, on top of, or underneath the first ink on a print substrate. In a specific embodiment, the first ink comprises water, an anionic dye, and a polyquaternary amine compound. In another specific embodiment, the first ink comprises water and a colorant comprising an anionic dye complexed with a polyquaternary amine compound. Yet another embodiment of the present invention is directed to a multicolor ink jet printing process which comprises: (1) incorporating into an ink jet printer a first ink having a first color and comprising water, a first colorant, and at least one of (a) a cationic polymer, (b) a cationic surfactant, or (c) an inorganic salt the cation of which has a tetraphenylboride salt that is substantially insoluble in water; (2) incorporating into the ink jet printer a second ink having a second color different from the first color and comprising water, a second colorant, and sodium tetraphenylboride; (3) causing droplets of the first ink to be ejected in an imagewise pattern onto a substrate; and (4) causing droplets of the second ink to be ejected in an imagewise pattern onto the substrate, wherein intercolor bleed between the first ink and the second ink is reduced when the second ink is printed adjacent to, on top of, or underneath the first ink on the substrate.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity, Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated for above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4 September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Other known droplet ejectors include those of the type disclosed in, for example, U.S. Pat. No. 6,127,198, the disclosure of which is totally incorporated herein by reference.

U.S. Pat. No. 6,001,899 (Gundlach et al.), the disclosure of which is totally incorporated herein by reference, discloses an ink composition which comprises water, an anionic dye, and a polyquaternary amine compound selected from the group consisting of polydiallyl ammonium compounds, polyquaternized polyvinylamines, polyquaternized polyallylamines, and mixtures thereof. Also disclosed are methods for using the aforementioned ink composition in ink jet printing processes.

U.S. Pat. No. 6,054,505 (Gundlach et al.), the disclosure of which is totally incorporated herein by reference, discloses an ink composition which comprises (1) water; (2) a nonpolymeric salt comprising at least one cation and at least one anion; and (3) a colorant comprising an anionic dye complexed with a polyquaternary amine compound. Also disclosed is an ink composition which comprises (1) water; (2) a nonpolymeric salt comprising at least one cation and at least one anion; (3) an anionic dye, and (4) a polyquaternary amine compound. In one embodiment, the polyquaternary amine compound is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

U.S. Pat. No. 6,005,022 (Schwarz), the disclosure of which is totally incorporated herein by reference, discloses an ink composition which comprises (1) water; (2) a dye; and (3) a cationic amido amine copolymer. Also disclosed are methods for using the aforementioned ink composition in ink jet printing processes.

U.S. Pat. No. 5,990,198 (Schwarz), the disclosure of which is totally incorporated herein by reference, discloses an ink composition which comprises (1) water; (2) an anionic dye; and (3) a copolymer of vinyl pyrrolidinone and a vinyl imidazolium salt. Also disclosed are methods for using the aforementioned ink compositions in ink jet printing processes.

U.S. Pat. No. 6,258,873 (Gundlach et al.), the disclosure of which is totally incorporated herein by reference, discloses an ink composition which comprises water, an acid dye, a monovalent salt, a polyquaternary amine compound, and an optional nonionic or cationic surfactant, said ink being substantially free of organic solvents. The ink is particularly suitable for applications such as ink jet printing and marking pens. The disclosed inks in some embodiments are substantially indelible. Also disclosed is a composition for removing the ink compositions from substrates to which they have been applied which comprises water and a dianionic surfactant, optionally further containing a salt, urea, and/or a viscosity building agent such as a gum.

U.S. Pat. No. 6,274,645 (Gundlach et al.), the disclosure of which is totally incorporated herein by reference, discloses a washing composition which comprises a linear alkyl diphenyl oxide disulfonate compound, a chloride, bromide, iodide, nitrate, acetylacetonate, polyphosphate, squarate, or sulfonate salt or mixtures thereof, and a cosolvent which is propylene glycol, dipropylene glycol, tripropylene glycol, diethylene glycol, glycerine, trimethylolethane, trimethylolpropane, or mixtures thereof.

U.S. Pat. No. 6,174,355 (Mayo et al.), the disclosure of which is totally incorporated herein by reference, discloses an ink composition comprising a colorant and poly(diallyl diethyl ammonium) bromide. Also disclosed are ink jet printing processes, including thermal ink jet and acoustic ink jet printing processes, for using the inks.

U.S. Pat. No. 6,270,214 (Smith et al.), the disclosure of which is totally incorporated herein by reference, discloses a process which comprises (a) applying to a substrate a fixing fluid which comprises a material selected from the group consisting of (1) block or graft copolymers of dialkylsiloxanes and polar, hydrophilic monomers capable of interacting with an ink colorant to cause the colorant to become complexed, laked, or mordanted, (2) organopolysiloxane copolymers having functional side groups capable of interacting with an ink colorant to cause the colorant to become complexed, laked, or mordanted, (3) perfluorinated polyalkoxy polymers, (4) perfluoroalkyl surfactants having thereon at least one group capable of interacting with an ink colorant to cause the colorant to become complexed, laked, or mordanted, and (5) mixtures thereof; (b) incorporating into an ink jet printing apparatus an ink composition which comprises water and a colorant which becomes complexed, laked, or mordanted upon contacting the fixing fluid; and (c) causing droplets of the ink composition to be ejected in an imagewise pattern onto the substrate.

U.S. Pat. No. 6,142,618 (Smith et al.), the disclosure of which is totally incorporated herein by reference, discloses a fluid deposition apparatus comprising (a) a fluid supply, (b) a porous fluid distribution member in operative connection with the fluid supply, enabling wetting of the fluid distribution member with a fluid, and (c) a porous metering membrane situated on the fluid distribution member, whereby the metering membrane enables uniform metering of the fluid from the fluid distribution member onto a substrate.

While known compositions and processes are suitable for their intended purposes, a need remains for improved aqueous ink compositions. In addition, a need remains for improved ink compositions particularly suitable for use in ink jet printing processes. Further, a need remains for ink compositions that, when printed adjacent to, on top of, or under other inks of different color, exhibit reduced intercolor bleed. Additionally, a need remains for ink compositions that, while enabling reduced intercolor bleed, also exhibit good line edge acuity.

SUMMARY OF THE INVENTION

The present invention is directed to an ink composition comprising water, a colorant, and sodium tetraphenylboride. Another embodiment of the present invention is directed to a set of inks for printing multicolor images in an ink jet printer, said ink set comprising (1) a first ink having a first color and comprising water, a first colorant, and at least one of (a) a cationic polymer, (b) a cationic surfactant, or (c) an inorganic salt the cation of which has a tetraphenylboride salt that is substantially insoluble in water; and (2) a second ink having a second color different from the first color and comprising water, a second colorant, and sodium tetraphenylboride, wherein intercolor bleed between the first ink and the second ink is reduced when the second ink is printed adjacent to, on top of, or underneath the first ink on a print substrate. In a specific embodiment, the first ink comprises water, an anionic dye, a polyquaternary amine compound, and an optional nonpolymeric salt. In another specific embodiment, the first ink comprises water, a colorant comprising an anionic dye complexed with a polyquaternary amine compound, and an optional nonpolymeric salt. In yet another specific embodiment, the first ink comprises water, an anionic dye, a quaternary ammonium surfactant, and an optional nonpolymeric salt. Yet another embodiment of the present invention is directed to a multicolor ink jet printing process which comprises: (1) incorporating into an ink jet printer a first ink having a first color and comprising water, a first colorant, and at least one of (a) a cationic polymer, (b) a cationic surfactant, or (c) an inorganic salt the cation of which has a tetraphenylboride salt that is substantially insoluble in water; (2) incorporating into the ink jet printer a second ink having a second color different from the first color and comprising water, a second colorant, and sodium tetraphenylboride, (3) causing droplets of the first ink to be ejected in an imagewise pattern onto a substrate, and (4) causing droplets of the second ink to be ejected in an imagewise pattern onto the substrate, wherein intercolor bleed between the first ink and the second ink is reduced when the second ink is printed adjacent to, on top of, or underneath the first ink on the substrate.

DETAILED DESCRIPTION OF THE INVENTION

Inks of the present invention contain an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The inks of the present invention also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-1 75; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI), Morfast Black Conc A (Morton-Thiokol); Diazol Black RN Quad (ICI); Orasol Blue GN (Ciba-Geigy); Sevron Blue 5GMF (ICI), various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like, Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, commercial carbon black dispersions such as Cabojet® 200, Cabojet® 300 (surface modified pigment), Cabojet® IJX 157, Cabojet® IJX 164, and the like, available from Cabot Chemical Co., the Bonjet® pigment dispersions from Orient Chemical Company of Japan, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2GO1 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

Inks of the present invention also contain sodium tetraphenylboride, of the general formula

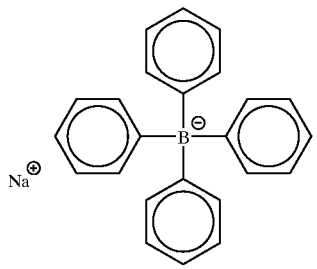

The sodium tetraphenylboride is present in the ink in any desired or effective amount, typically at least about 0.1 percent by weight of the ink, preferably at least about 0.5 percent by weight of the ink, and more preferably at least about 1 percent by weight of the ink, and typically no more than about 10 percent by weight of the ink, preferably no more than about 5 percent by weight of the ink, and more preferably no more than about 3 percent by weight of the ink, although the amount can be outside of these ranges.

While not being limited to any particular theory, it is believed that the sodium tetraphenylboride in the inks of the present invention can undergo a disproportionation/ion exchange reaction with cationic components of other inks with which it is printed to generate a colloidal, water insoluble tetraphenylboride salt that precipitates and serves to gel the interface of the two inks when they are printed onto a print substrate adjacent to or on top of each other during a multicolor printing process. Another embodiment of the present invention is directed to a set of inks for printing multicolor images in an ink jet printer, said ink set comprising (1) a first ink having a first color and comprising water, a first colorant, and at least one of (a) a cationic polymer, (b) a cationic surfactant, or (c) an inorganic salt the cation of which has a tetraphenylboride salt that is substantially insoluble in water; and (2) a second ink having a second color different from the first color and comprising water, a second colorant, and sodium tetraphenylboride, wherein intercolor bleed between the first ink and the second ink is reduced when the second ink is printed adjacent to, on top of, or underneath the first ink on a print substrate.

In these specific embodiments, the first ink comprises an aqueous liquid vehicle as set forth hereinabove with respect to the inks containing sodium tetraphenylboride. The first ink can also contain a colorant as set forth hereinabove with respect to the inks containing sodium tetraphenylboride.

In one specific embodiment, the first ink comprises a cationic polymer. Any desired or suitable cationic polymer can be employed. In a specific embodiment, the cationic polymer is a polyquaternary amine compound.

The polyquaternary amine compound is a polymer containing quaternary groups in the repeat units thereof. The polymer typically has a weight average molecular weight of from about 1,000 to about 10,000,000, preferably from about 3,000 to about 1,000,000, and more preferably from about 5,000 to about 400,000, although the value can be outside of these ranges. The polymer typically has a number average molecular weight of from about 800 to about 11,000,000, preferably from about 3,300 to about 1,100,000, and more preferably from about 5,600 to about 450,000, although the value can be outside of these ranges. The polymer typically has from about 5 to about 70,000 repeat monomer units therein, preferably from about 21 to about 7,000 repeat monomer units, and more preferably from about 35 to about 2,800 repeat monomer units, although the number of repeat monomer units can be outside of this range. Suitable polyquaternary amine compounds typically are of the general formulae

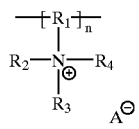

or

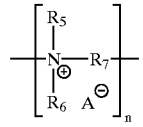

wherein n is an integer representing the number of repeat monomer units, $R_1$ and $R_7$ each, independently of the other, is an alkylene group, including saturated, unsaturated, cyclic, and substituted alkylene groups (wherein hetero atoms, such as oxygen, sulfur, nitrogen, silicon, phosphorus, and the like can be present in the alkylene group, and the alkylene groups including polymethylene oxide groups, polyethylene oxide groups, polypropylene oxide groups, and the like), typically with from 1 to about 30 carbon atoms and preferably with from 1 to about 6 carbon atoms, an arylene group, including substituted arylene groups, typically with from 6 to about 50 carbon atoms and preferably with from 6 to about 18 carbon atoms, an arylalkylene group, including substituted arylalkylene groups, typically with from 7 to about 60 carbon atoms and preferably with from 7 to about 20 carbon atoms, or an alkylarylene group, including substituted alkylarylene groups, typically with from 7 to about 60 carbon atoms and preferably with from 7 to about 20 carbon atoms, and $R_2$, $R_3$, $R_4$, $R_5$, and $R_6$ each, independently of the others, are hydrogen atoms, alkyl groups, including saturated, unsaturated, cyclic, and substituted alkyl groups (wherein hetero atoms, such as oxygen, sulfur, nitrogen, silicon, phosphorus, and the like can be present in the alkyl group), typically with from 1 to about 30 carbon atoms and preferably with from 1 to about 6 carbon atoms, aryl groups, including substituted aryl groups, typically with from 6 to about 50 carbon atoms and preferably with from 6 to about 18 carbon atoms, arylalkyl groups, including substituted arylalkyl groups, typically with from 7 to about 60 carbon atoms and preferably with from 7 to about 20 carbon atoms, or alkylaryl groups, including substituted alkylaryl groups, typically with from 7 to about 60 carbon atoms and preferably with from 7 to about 20 carbon atoms, wherein the substituents on the substituted alkyl, alkylene, aryl, arylene, arylalkyl, arylalkylene, alkylaryl, and alkylarylene groups can be (but are not limited to) hydroxy groups, amine groups, carbonyl groups, sulfide groups, halogen atoms, mixtures thereof, and the like, wherein two or more substituents can be joined together to form a ring.

Examples of suitable polyquaternary amine compounds include (but are not limited to) polydiallyl ammonium compounds, of the general formula

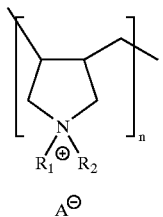

$A^\ominus$ wherein n is an integer representing the number of repeat monomer units, $R_1$ and $R_2$ each, independently of the other, are hydrogen atoms, alkyl groups, including saturated, unsaturated, cyclic, and substituted alkyl groups (wherein hetero atoms, such as oxygen, sulfur, nitrogen, silicon, phosphorus, and the like can be present in the alkyl group), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from about 7 to about 60 carbon atoms and preferably with from 7 to about 20 carbon atoms, or alkylaryl groups, including substituted alkylaryl groups, typically with from about 7 to about 60 carbon atoms and preferably with from 7 to about 20 carbon atoms, wherein the substituents on the substituted alkyl aryl, arylalkyl, and alkylaryl groups can be (but are not limited to) hydroxy groups, amine groups, carbonyl groups, sulfide groups, halogen atoms, mixtures thereof, and the like, wherein two or more substituents can be joined together to form a ring, and A is an anion, such as Cl—, Br—, I—, $HSO_4$—, $HSO_3$—, $S_4^2{13}$, $SO_3^2{13}$, $CH_3SO_3$—, $CH_3C_6H_4SO_3$—, $NO_3$—, HCOO—, $CH_3COO$—, $H_2PO_4$—, $HPO_4^{2-}$, SCN—, $BF_4$—, $ClO_4$—, $SSO_3$—, $PF_6$—, $SbCl_6$—, or the like, such as polydiallyl dimethyl ammonium compounds, including polydiallyl dimethyl ammonium chloride, of the formula

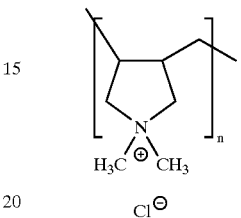

wherein n is an integer representing the number of repeat monomer units, commercially available with a molecular weight of about 400,000 (wherein n is an integer of about 2,500) from Calgon Corp. as 261-RV, and with a molecular weight of about 5,000 (wherein n is an integer of about 31) from Calgon Corp. as VARIKEM 110 or E2253.

Also suitable are polyquaternized polyvinylamines, of the general formula

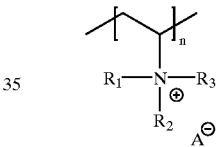

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (wherein hetero atoms, such as oxygen, sulfur, nitrogen, silicon, phosphorus, and the like can be present in the alkyl group), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, or alkylaryl groups, including substituted alkylaryl groups, typically with from 7 to about 60 carbon atoms and preferably with from 7 to about 20 carbon atoms, wherein the substituents on the substituted alkyl, aryl, arylalkyl, and alkylaryl groups can be (but are not limited to) hydroxy groups, amine groups, carbonyl groups, sulfide groups, halogen atoms, mixtures thereof, and the like, wherein two or more substituents can be joined together to form a ring, and A is an anion, such as Cl—, Br—, I—, $HSO_4$—, $HSO_3$—, $SO_4^{2-}$, $SO_3^{2-}$, $CH_3SO_3$—, $CH_3C_6H_4SO_3$—, $NO_3$—, HCOO—, $CH_3COO$—, $H_2PO_4$—, $HPO_4^{2-}$, SCN—, $BF_4$—, $ClO_4$—, $SSO_3$—, $PF_6$—, $SbCl_6$—, or the like.

Also suitable are polyquaternized polyallylamines, of the general formula

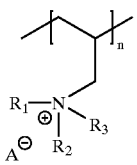

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (wherein hetero atoms, such as oxygen, sulfur, nitrogen, silicon, phosphorus, and the like can be present in the alkyl group), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, or alkylaryl groups, including substituted alkylaryl groups, typically with from 7 to about 60 carbon atoms and preferably with from 7 to about 20 carbon atoms, wherein the substituents on the substituted alkyl, aryl, arylalkyl, and alkylaryl groups can be (but are not limited to) hydroxy groups, amine groups, carbonyl groups, sulfide groups, halogen atoms, mixtures thereof, and the like, wherein two or more substituents can be joined together to form a ring, and A is an anion, such as Cl—, Br—, I—, $HSO_4$—, $HSO_3$—, $SO_4^{2-}$, $SO_3^{2-}$, $CH_3SO_3$—, $CH_3C_6H_4SO_3$—, $NO_3$—, HCOO—, $CH_3COO$—, $H_2PO_4$—, $HPO_4^{2-}$, SCN—, $BF_4$—, $ClO_4$—, $SSO_3$—, $PF_6$—, $SbCl_6$—, or the like.

Also suitable are epichlorohydrin/amine copolymers, including those of the general formula

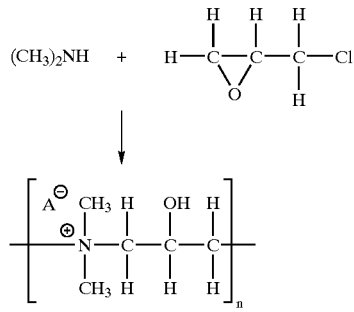

wherein n is an integer of from about 3 to about 3,000, and preferably from about 5 to about 100, although the value can be outside of these ranges, and A is any suitable or desired anion, such as Cl—, Br—, I—, $HSO_4$—, $HSO_3$—, $SO_4^{2-}$, $SO_3^{2-}$, $CH_3SO_3$—, $CH_3C_6H_4SO_3$—, $NO_3$—, HCOO—, $CH_3COO$—, $H_2PO_4$—, $HPO_4^{2-}$, SCN—, $BF_4$—, $ClO_4$—, $SSO_3$—, $PF_6$—, $SbCl_6$—, or the like. Polymers of this formula are commercially available from Hercules, Wilmington, Del. as RETEN 200 or RETEN 201 (molecular weight generally less than 10,000), and from Cytex, Inc., West Patterson, N.J., as CYPRO 514, 515, and 516 (wherein the polymers have a molecular weight range of from about 75,000 to about 250,000 and n is from about 870 to about 3,000), and as SUPERFLOC C567 (wherein the polymer has a molecular weight of about 10,000 and n is from about 110 to about 120, typically about 116).

Also suitable are cationic amido amine copolymers. Examples of suitable cationic amido amine copolymers include those of the general formula

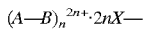

wherein X is an anion, such as Cl—, Br—, I—, $HSO_4$—, $HSO_3$—, $SO_4^{2-}$, $SO_3^{2-}$, $CH_3SO_3$—, $CH_3C_6H_4SO_3$—, $PF_6$—, $SbCl_6$—, $ClO_4$—, $SSO_3$—, or the like, n is an integer representing the number of repeating monomer units, and typically is from about 2 to about 1,000, preferably from about 3 to about 200, more preferably from about 3 to about 100, and even more preferably from about 3 to about 10, although the value can be outside of these ranges, "A" is

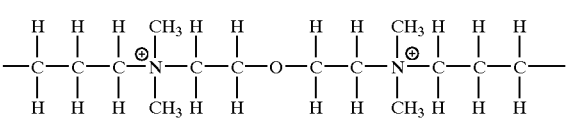

and "B" is selected from the group consisting of (a) monomers of the formula

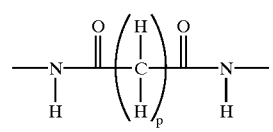

wherein p is an integer representing the number of repeat monomer units, and typically is from 1 to about 12, preferably from 1 to about 7, and more preferably from 1 to about 4, although the value can be outside of these ranges, such as (i) azeleic acid diamido, wherein p is 7, of the formula

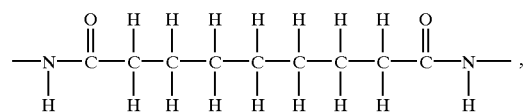

or (ii) adipic acid diamido, wherein p is 4, of the formula

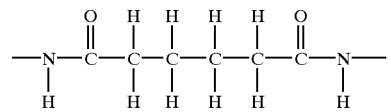

and (b) ureido, of the formula

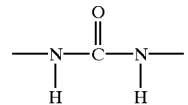

Mixtures of two or more "B" monomers can also be used within the polymer. In a preferred embodiment, these specific polymers typically are condensation polymers, with alternating "A" and "B" monomer units. The weight average molecular weight of the polymer typically is from about 1,000 to about 100,000, preferably from about 1,000 to about 30,000, and more preferably from about 2,000 to about 5,000, although the value can be outside of these ranges. Copolymers of an amine and an amide are commercially available from, for example, Rhone-Poulenc, Cranbury, N.J., as, for example, MIRAPOL AZ-1, of the above formula wherein the "B" monomer is azeleic acid diamido, n has an average value of about 100, and the molecular weight is about 50,000, MIRAPOL AD-1, of the above formula wherein the "B" monomer is adipic acid diamido, n has an average value of about 100, and the molecular weight is about 50,000, and MIRAPOL A-15, of the above formula wherein the "B" monomer is ureido, n has an average value of about 6, and the molecular weight is about 2,260.

Also suitable are copolymers of vinyl pyrrolidinone and a vinyl imidazolium salt. In one embodiment, the copolymer is of a vinyl imidazolium salt of the formula

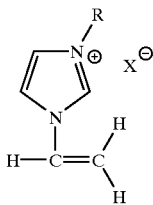

wherein X is an anion and R is a hydrogen atom or an alkyl group, typically with from 1 to about 8 carbon atoms and preferably with from 1 to about 3 carbon atoms, and vinyl pyrrolidinone, of the formula

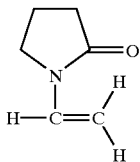

wherein the copolymer is of the general formula

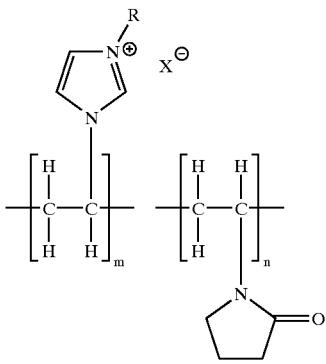

wherein X is any suitable or desired anion, such as Cl—, Br—, I—, $HSO_4$—, $HSO_3$—, $SO_4^{2-}$, $SO_3^{2-}$, $CH_3SO_3$—, $CH_3C_6H_4SO_3$—, $NO_3$—, HCOO—, $CH_3COO$—, $H_2PO_4$—, $HPO_4^{2-}$, SCN—, $BF_4$—, $ClO_4$—, $SSO_3$—, $PF_6$—, $SbCl_6$—, or the like, R is a hydrogen atom or an alkyl group, typically with from 1 to about 8 carbon atoms, and preferably with from 1 to about 3 carbon atoms, m is an integer representing the number of repeat vinyl imidazolium units, and n is an integer representing the number of repeat vinyl pyrrolidinone units. When R is a hydrogen atom, the pH of the ink can be adjusted to provide optimal ink-paper interaction; for example, the hydrogen atom can be extracted upon contact with the paper, or the cationic character of the polymer can be adjusted with ink pH. Random copolymers of the above formula generally are preferred, although alternating and block copolymers are also suitable. The weight average molecular weight of the polymer typically is from about 1,000 to about 1,000,000, preferably from about 1,000 to about 100,000, and more preferably from about 2,000 to about 5,000, although the value can be outside of these ranges. The ratio of vinyl imidazolium monomers to vinyl pyrrolidinone monomers typically is from about 99:1 to about 5:95, preferably from about 95:5 to about 20:80, more preferably from about 95:5 to about 30:70, and even more preferably from about 95:5 to about 50:50, although the value can be outside of these ranges. Vinyl pyrrolidinone/vinyl imidazolium salt copolymers are commercially available; for example, BASF, Parsippany, N.J., provides vinyl imidazolium chloride/vinyl pyrrolidinone copolymers (of the above formula wherein R is $CH_3$) with a molecular weight of about 100,000 in three monomer ratios: LUVIQUAT® FC905 has a vinyl imidazolium chloride:vinyl pyrrolidinone ratio of 95:5 with 6.7 milliequivalents per gram of cationic groups, LUVIQUAT® FC550 has a vinyl imidazolium chloride:vinyl pyrrolidinone ratio of 50:50 with 3.0 milliequivalents per gram of cationic groups, and LUVIQUAT® FC370 has a vinyl imidazolium chloride:vinyl pyrrolidinone ratio of 30:70 with 1.8 milliequivalents per gram of cationic groups. Also available from BASF is LUVIQUAT® HM552, with a molecular weight of about 800,000 and a vinyl imidazolium chloride:vinyl pyrrolidinone ratio of 50:50.

Mixtures of two or more polyquaternary amine compounds can also be present in the first ink.

The polyquaternary amine compound is present in the first ink in any desired or effective amount, typically at least about 0.01 percent by weight of the ink, more typically at least about 0.5 percent by weight of the ink, and preferably at least about 2 percent by weight of the ink, and typically no more than about 25 percent by weight of the ink more typically no more than about 15 percent by weight of the ink, preferably no more than about 10 percent by weight of the ink more preferably no more than about 7 percent by weight of the ink, and even more preferably no more than about 5 percent by weight of the ink, although the amount can be outside of these ranges.

In another specific embodiment, the first inks according to the present invention containing a polyquaternary amine compound can also include an anionic dye. In this instance, the anionic dye and the polyquaternary amine compound are believed to form a complex. Any suitable anionic dye or mixture of anionic dyes compatible with the ink liquid vehicle can be used. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc., Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-1 75; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof.

In this specific embodiment, the anionic dye is present in the first ink composition in any desired or effective amount, typically at least about 0.05 percent by weight of the ink, preferably at least about 0.1 percent by weight of the ink, and more preferably at least about 2 percent by weight of the ink, and typically no more than about 15 percent by weight of the ink, preferably no more than about 10 percent by weight of the ink, and more preferably no more than about 5 percent by weight of the ink, although the amount can be outside of these ranges.

The preferred relative amounts of polyquaternary amine and anionic dye in the first ink can also be expressed as a stoichiometric ratio, with the molar ratio of anionic dye groups to cationic polyquaternary groups typically being at least about 1:0.33, preferably at least about 1:1, more preferably at least about 1:1.25, and even more preferably at least about 1:1.5, and typically no more than about 1:20, preferably no more than about 1:10, and more preferably no more than about 1:3, although the relative amounts can be outside of these ranges.

While not being limited to any particular theory, it is believed that the polyquaternary amine and the anionic dye tend to form an ion exchange complex upon admixing of the ink ingredients. This complex can be rendered soluble in the ink vehicle by the presence water soluble ionic salts, the anions of which limit the degree of complex formation in solution. While the ink ingredients can be mixed in any desired order, it is preferred that any salts present in the ink be added prior to addition of the dye or the polyquaternary amine. The ability to form a complex between the anionic dye and the cationic polymer generally is independent of ink pH over the normal pH range of the ink.

In this specific embodiment wherein the first ink contains a polyquaternary amine and an anionic dye, the first inks of the present invention preferably further contain a nonpolymeric salt comprising at least one cation and at least one anion. Examples of suitable cations include alkali metal cations, such as Li+, Na+, and K+, alkaline earth metal cations, such as $Mg^{2+}$ and $Ca^{2+}$, nonpolymeric or monomeric ammonium and quaternary amine cations, including those of the general formula

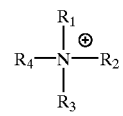

wherein each of $R^1$, $R^2$, $R^3$, and $R_4$, independently of the others, is a hydrogen atom, an alkyl group (including saturated, unsaturated, cyclic, and substituted alkyl groups, wherein substituted alkyl groups can include alkoxy or polyalkoxy groups such as ethylene oxide, polyethylene oxide, or the like), preferably with from 1 to about 10 carbon atoms and more preferably with from 1 to about 4 carbon atoms, although the number of carbon atoms can be outside of this range, aryl groups, including substituted aryl groups, preferably with from 6 to about 18 carbon atoms and more preferably with from 6 to about 12 carbon atoms, although the number of carbon atoms can be outside of this range, or arylalkyl groups, preferably with from 7 to about 20 carbon atoms and more preferably with from 7 to about 13 carbon atoms, wherein the substituents on the substituted alkyl, aryl, arylalkyl, and alkylaryl groups can be (but are not limited to) hydroxy groups, amine groups, carbonyl groups, sulfide groups, halogen atoms, mixtures thereof, and the like, wherein two or more substituents can be joined together to form a ring, with specific examples of ammonium and quaternary amine cations including $NH_4+$, $N(CH_3)_{4+}$, $H_3NCH_2CH_2NH_3{}^{2+}$, $(H_3C)_3NCH_2CH_2N(CH_3)_3{}^{2+}$, imidazolium, quaternized 1,4-diazabicyclo(2.2.2)octane, choline, of the formula

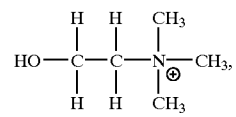

alkyl amine quaternary salts such as ETHOQUAD C/12, of the formula

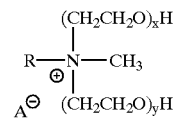

wherein R is a long chain alkyl group with 12 carbon atoms, x and y are integers of 0, 1, or 2 representing the number of ethoxy groups, wherein x+y=2, and A is an anion, such as chloride, commercially available from Akzo Chemie, Chicago, Ill., and the like, as well as mixtures thereof. Any desired anion can be employed. Examples of suitable anions include $NO_3^-$, $ClO_4^-$, $SO_4^{2-}$, organic acid anions, such as formate, acetate, propionate, and the like, acetylacetonate, of the formula

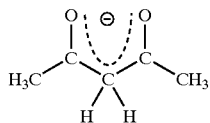

squarate, of the formula

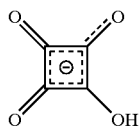

halides, including chloride, bromide, and iodide, and the like, as well as mixtures thereof. Specific examples of suitable salts include lithium chloride, lithium bromide, lithium iodide, lithium nitrate, lithium formate, lithium acetate, lithium propionate, sodium chloride, sodium bromide, sodium iodide, sodium nitrate, sodium perchlorate, sodium formate, sodium acetate, sodium propionate, potassium chloride, potassium bromide, potassium iodide, potassium formate, potassium acetate, potassium propionate, calcium chloride, calcium nitrate, calcium formate, calcium acetate, calcium propionate, magnesium chloride, magnesium sulfate, magnesium formate, magnesium acetate, magnesium propionate, ammonium chloride, ammonium bromide, ammonium iodide, ammonium acetate, ammonium formate, ammonium nitrate, ammonium sulfate, ammonium propionate, tetramethylammonium chloride, tetramethylammonium formate, tetramethylammonium acetate, tetramethylammonium propionate, ethylene diamine dihydrochloride, 1,4-diazabicyclo(2,2,2)octane salts, such as hexamethonium bromide, of the formula

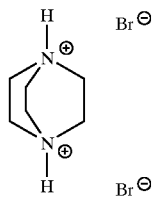

imidazole salts, such as imidazolium chloride, acetylacetonate salts, such as lithium acetylacetonate, squarate salts, such as tetramethylammonium squarate, choline salts, such as choline chloride, ETHOQUAD C/12, and the like. The salt can also be a complex salt, including transition metal complexes such as $Zn(NH_3)_4$ or the like. The salt is present in the first ink in any desired or effective amount, typically at least about 0.1 percent by weight of the ink, preferably at least about 1 percent by weight of the ink, and more preferably at least about 5 percent by weight of the ink, and typically no more than about 40 percent by weight of the ink, preferably no more than about 30 percent by weight of the ink, more preferably no more than about 20 percent by weight of the ink, and even more preferably no more than about 15 percent by weight of the ink, although the amount can be outside of these ranges.

While not being limited to any particular theory, it is believed that the presence of the salt suppresses the extent of complex formation in solution and thereby maintains the solubility of the dye/polyquaternary amine mixture which is employed as a colorant in the first inks of the present invention. Again, while not being limited to any particular theory, it is believed that within the first ink, the polyquaternary amine tends to be associated or complexed with the anionic dye, with the dye playing the role of a counterion. This complex is rendered soluble in the ink vehicle by virtue of the presence water soluble ionic salts, the anions of which limit the degree of complex formation in solution. The presence of the salt in the first ink can also reduce jitter when the ink is jetted and increase ink surface tension.

In another specific embodiment, the first ink comprises a cationic surfactant. Any desired or suitable cationic surfactant can be employed. Examples of suitable cationic surfactants include (but are not limited to) octyl trimethyl ammonium chloride; tridecyloxypropyl dihydroxy ethyl methyl ammonium chloride, methyl bis(2-hydroxy ethyl)coco ammonium chloride; (2-(2-carboxy ethoxy) ethyl)2-(2-hydroxy)ethoxy)ethyl)methyl dodecyl ammonium methyl sulfate; (2-(2-carboxy ethoxy)ethyl) (2-(2-hydroxy)ethoxy ethyl) methyl octadecyl ammonium methyl sulfate; N-tetradecyl dimethyl-naphthyl methyl ammonium chloride; octadecyl diethanol methyl ammonium chloride; octadecyl dihydroxy ethyl methyl ammonium chloride; bis ((ethyl tallowate))-2-hydroxyethyl methyl ammonium methyl sulfate; ditallow amido ammonium methyl sulfate; bis hydroxyethyl dihydroxypropyl stearaminium chloride; methyl bis(oleyl amido ethyl)2-hydroxyethyl ammonium methyl sulfate; methyl bis(soya amido ethyl)2-hydroxyethyl ammonium methyl sulfate; methyl bis(tallow amido ethyl) 2-hydroxy propylammonium methyl sulfate; and the like, as well as mixtures thereof. In this embodiment, the cationic surfactant is present in the first ink in any desired or effective amount, typically at least about 1 percent by weight of the ink, and typically no more than about 15 percent by weight of the ink, preferably no more than about 10 percent by weight of the ink, and more preferably no more than about 5 percent by weight of the ink, although the amount can be outside of these ranges.

In yet another specific embodiment, the first ink comprises an inorganic salt the cation of which has a tetraphenylboride salt that is substantially insoluble in water. By "substantially insoluble in water" is meant that the tetraphenylboride salt of the cation has a solubility in water, at 25° C., of typically no more than about 10 grams per liter, preferably no more than about 5 grams per liter, and more preferably no more than about 1 gram per liter. The selected inorganic salt is soluble in the first ink and does not, in itself, precipitate the colorant(s) in the first ink, but upon contact of the first ink with the second ink containing sodium tetraphenylboride, an insoluble tetraphenylboride salt is formed. Examples of suitable cations include (but are not limited to) tetramethylammonium, tetraethylammonium, tetrabutylammonium, pyridinium, N-methyl pyridinium, K+, Rb+, Cs+, $Ca^{2+}$, $Mg^{2+}$, $Sr^{2+}$, $Ba^{2+}$, $La^{3+}$, $Zn^{2+}$, $Al^{3+}$, $Eu^{3+}$, $Gd^{3+}$, and the like, as well as mixtures thereof. Examples of suitable inorganic salts for the first ink include (but are not limited to) tetramethyl ammonium chloride, tetraethyl ammonium chloride, tetrabutyl ammonium chloride, pyridinium chloride, N-methyl pyridinium chloride, potassium chloride, rubidium chloride, cesium chloride, magnesium chloride, strontium chloride, barium chloride, zinc chloride, aluminum nitrate, europium chloride, gadolinium chloride, and the like, as well as mixtures thereof. In this embodiment, the inorganic salt is present in the first ink in any desired or effective amount, typically at least about 0.1 percent by weight of the ink, preferably at least about 1 percent by weight of the ink, and more preferably at least about 2 percent by weight of the ink, and typically no more than about 15 percent by weight of the ink, preferably no more than about 10 percent by weight of the ink, and more preferably no more than about 5 percent by weight of the ink, although the amount can be outside of these ranges.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

When used in ink jet printing applications, the first and second ink compositions according to the present invention are generally of a viscosity suitable for use in said ink jet printing processes. For example, for thermal ink jet printing applications, at room temperature (i.e., about 25° C.), typically, the ink viscosity is typically at least about 1 centipoise and typically is no more than about 10 centipoise, preferably no more than about 7 centipoise, and more preferably no more than about 5 centipoise, although the viscosity can be outside of these ranges, particularly when the ink is used for applications such as acoustic ink jet printing. When used in marking pen applications, the ink compositions are generally of a viscosity suitable for use in said applications.

The first and second ink compositions can be of any suitable or desired pH. For some embodiments, such as thermal ink jet printing processes, typical pH values are at least about 2, preferably at least about 3, and more preferably at least about 5, and typically up to about 11, preferably up to about 10, and more preferably up to about 9, although the pH can be outside of these ranges.

The first and second ink compositions can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The ink compositions of the present invention can be used in a process which entails incorporating the ink composition into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Synthesis of Polydimethyldiallyammonium/Acid Yellow 23 Complex

It has been found to be advantageous to use pre-complexed compositions of dye with quaternary ammonium polymers in the formulation of inks containing these components, The complex was formed by dissolving the quaternary polymer and the anionic dye in separate ~5 percent by weight aqueous solutions and mixing the solutions together. A precipitate formed immediately and was isolated by filtration or centrifugation. In the preparation of the poly(dimethyldiallyammonium/Acid Yellow 23 complex, 1 mole of Acid Yellow 23 was mixed with 4 molar repeat residues ($C_8H_6N+$) of the poly (dimethyldiallyammonium chloride) (CALGON CP 1030, obtained from Calgon Corp.) to yield a precipitate that comprised 2.7 $C_8H_6N+$ molar repeat residues per every one mole of Acid Yellow 23. This material was used in the preparation of the inks delineated in Examples II and III.

Comparative Example A

A black ink composition was prepared by simple mixing of the following ingredients:

| Ingredient | Supplier | Amount (grams) |
| --- | --- | --- |
| CABOT ® IJX-157 carbon black dispersion | Cabot Corp. | 20 |
| sulfolane* | Phillips 66 | 12.63 |
| 2-pyrrolidinone** | Aldrich Chemical Co. | 8.42 |
| SILWET ® L-7200 | Witco Corp. | 0.60 |
| deionized water | — | 76.4 |

*95 wt. % sulfolane, 5 wt. % water
**95 wt. % 2-pyrrolidinone, 5 wt. % water

EXAMPLE II

A yellow ink composition was prepared by simple mixing of the following ingredients:

| Ingredient | Supplier | Amount (grams) |
|---|---|---|
| deionized water | — | 53.05 |
| sulfolane* | Phillips 66 | 20.25 |
| choline chloride | Aldrich Chemical Co. | 10.13 |
| 2-pyrrolidinone** | Aldrich Chemical Co. | 10.13 |
| Polydimethyldiallyammonium/ Acid Yellow 23 Complex | Example I | 5.43 |
| 1-octyl-2-pyrrolidinone | Aldrich Chemical Co. | 1 |

*95 wt. % sulfolane, 5 wt. % water
**95 wt. % 2-pyrrolidinone, 5 wt. % water

The resulting ink had a viscosity of 3.16 centipoise, a surface tension of 31.1 dynes per centimeter, a pH of 7.0, and a conductivity of 22.8 millimhos per centimeter.

EXAMPLE III

A yellow ink composition was prepared by simple mixing of the following ingredients:

| Ingredient | Supplier | Amount (grams) |
|---|---|---|
| deionized water | — | 60.71 |
| sulfolane* | Phillips 66 | 200 |
| calcium chloride dihydrate | Aldrich Chemical Co. | 10.13 |
| 2-pyrrolidinone** | Aldrich Chemical Co. | 10.13 |
| Poly(dimethyldiallyammonium/ Acid Yellow 23 Complex | Example I | 3.26 |
| 1-octyl-2-pyrrolidinone | Aldrich Chemical Co, | 1 |

*95 wt. % sulfolane, 5 wt. % water
**95 wt. % 2-pyrrolidinone, 5 wt. % water

The resulting ink had a viscosity of 2.67 centipoise, a surface tension of 30.5 dynes per centimeter, a pH of 7.0, and a conductivity of 25.6 millimhos per centimeter.

EXAMPLE IV

A black ink composition according to the present invention was prepared by simple mixing of the following ingredients:

| Ingredient | Supplier | Amount (grams) |
|---|---|---|
| CABOT ® IJX-157 carbon black dispersion | Cabot Corp. | 16.67 |
| sulfolane* | Phillips 66 | 12.0 |
| 2-pyrrolidinone** | Aldrich Chemical Co. | 8.0 |
| tetraphenyl boron sodium | Aldrich Chemical Co. | 1.0 |
| SILWET ®L-7200 | Witco Corp. | 0.60 |
| deionized water | — | 61.73 |

*95 wt. % sulfolane, 5 wt. % water
**95 wt. % 2-pyrrolidinone, 5 wt. % water

EXAMPLE V

The inks of Examples II, III, and IV and Comparative Example A were incorporated into a XEROX® M-750 thermal ink jet printer operated in normal mode and used to generate yellow and black images on the following papers:

| Paper | Product | Paper Weight |
|---|---|---|
| CA2 | HAMMERMILL ® COPY PLUS | 20 lb/75 g |
| CA11 | XEROX ® HIGH TECH LASER | 24 lb/90 g |
| CA12 | XEROX ® COLOR XPRESSIONS ® | 24 lb/90 g |
| CA14 | XEROX ® HIGH TECH INK JET (Boise Mill) | 20 lb/75 g |
| CE9 | XL BUSINESS 3R91820 | 80 g |
| CJ1 | FUJI XEROX ® "S" thin copier paper | 56 g |
| CJ3 | FUJI XEROX ® MULTIACE | 63 g |
| CJ4 | FUJI XEROX ® "P" copier paper | 64 g |
| CJ5 | FUJI XEROX ® "J" color copier paper | 82 g |
| CJ6 | FUJI XEROX ® WR (white recycled) | 67 g |
| CJ7 | FUJI XEROX ® WR100 (100% post waste papers) | 67 g |
| CJ8 | YAMAYURI | — |
| CJ9 | FUJI XEROX ® SANKOKU L | — |
| CJ10 | FUJI XEROX ® GREEN 100 | — |
| CS8 | XEROX ® Office Paper | 75 g |
| CJ11 | FUJI XEROX ® HOKUETSU L | — |
| CJ12 | SHARP ® PPC Paper | — |
| FX KL | FUJI XEROX ® KAKUSAKU-L | — |

The Midrange Frequency Line Edge Noise (MFLEN), which is a way to evaluate line edge sharpness, was employed to evaluate line sharpness of the black line images on different plain papers. MFLEN 5 values were measured to quantify line edge raggedness for the black ink printed on various plain papers without a neighboring ink. Smaller MFLEN numbers indicate sharper image edges.

Intercolor bleed was also measured and evaluated as a MFLEN value. Intercolor bleed (ICB) usually is caused by undesirable mixing of inks near the bordering areas and results in a distorted line image with irregular edges and large MFLEN values. Smaller intercolor bleed MFLEN numbers are desirable because they shows sharper line image edges between the two different colored inks with reduced intercolor bleed.

The MFLEN numbers were obtained by equipment comprising a personal computer, an illuminating light source, a filter, and an imaging microscope with a CDD sensor (light sensor). The equipment was calibrated with a standard image (line with sharp edges). Software using a Fourier Transform technique was used to calculate the MFLEN data and line width. The data below is an average of measurements of line edge noise on a test pattern comprising discrete (spatially separated) horizontal and vertical black lines and adjacent horizontal and vertical color lines (not separated by any space). The average MFLEN of the images made with the black inks as well as the black ink next to the yellow ink (intercolor bleed (ICB) between the inks are shown in the table below, with the Example numbers of the inks used shown in the column headings:

| | A, II | | A, III | | IV, II | | IV, III | |
|---|---|---|---|---|---|---|---|---|
| Paper | MFLEN | ICB | MFLEN | ICB | MFLEN | ICB | MFLEN | ICB |
| CA2 | 28.4 | 41.5 | 28.4 | 16.3 | 23.2 | 21.8 | 25.6 | 14.5 |
| CA11 | 12.5 | 43 | 12.5 | 19.0 | 15.2 | 29.1 | 16.4 | 18 |
| CA14 | 1.2 | 9.4 | 1.2 | 6.8 | 6.3 | 16.5 | 2.5 | 4.7 |
| CE9 | 14.3 | 68.6 | 14.3 | 43.7 | 11.5 | 41.8 | 13.1 | 34.5 |
| CJ7 | 11.7 | 20.2 | 11.7 | 12.6 | 5.7 | 20.4 | 5.5 | 7.6 |
| CS8 | 5.3 | 33.4 | 5.3 | 25.6 | 14.1 | 26.6 | 14.9 | 21.4 |
| CA12 | 1 | 4.1 | 1 | 2.3 | 2.0 | 2.6 | 1.6 | 2.4 |
| average | 10.6 | 31.5 | 10.6 | 18.0 | 11.1 | 22.7 | 11.4 | 14.7 |
| CJ1 | 1.3 | 25.4 | 1.3 | 15.1 | 4.5 | 27.4 | 2.4 | 5.5 |
| CJ3 | 3 | 32.3 | 3 | 12.4 | 2.0 | 30.9 | 1.8 | 8 |
| CJ4 | 6.3 | 37.3 | 6.3 | 17.7 | 10.4 | 32.3 | 7.1 | 12.2 |

-continued

| Paper | A, II MFLEN | ICB | A, III MFLEN | ICB | IV, II MFLEN | ICB | IV, III MFLEN | ICB |
|---|---|---|---|---|---|---|---|---|
| CJ5 | 1.4 | 21.1 | 1.4 | 4.2 | 1.2 | 11.7 | 1.4 | 4.5 |
| CJ6 | 2.1 | 44.5 | 2.1 | 23.4 | 7.0 | 35.4 | 3.9 | 13.4 |
| CJ8 | 14.3 | 33.9 | 14.3 | 20.2 | 17.5 | 21.6 | 16.6 | 13.3 |
| CJ9 | 4.8 | 34.8 | 4.8 | 23.5 | 10.7 | 25.6 | 14.2 | 17.6 |
| CJ10 | 8.4 | 43.8 | 8.4 | 22.7 | 9.3 | 32.6 | 12.8 | 25.1 |
| CJ11 | 1 | 33.9 | 1 | 17.7 | 4.3 | 23.2 | 4 | 13.2 |
| CJ12 | 1.5 | 27.6 | 1.5 | 15.4 | 1.4 | 26.7 | 2 | 11 |
| FX KL | 24.2 | 45.1 | 24.2 | 34.0 | 23.8 | 30.1 | 23.2 | 24.7 |
| average | 6.2 | 34.5 | 6.2 | 18.8 | 8.4 | 27 | 8.1 | 13.5 |

As the data indicate, the black ink containing sodium tetraphenylboride (Example IV) exhibited similar line edge acuity to the black ink containing no sodium tetraphenylboride (Comparative Example A), indicating that incorporation of the sodium tetraphenylboride into the ink did not cause any substantial impairment of MFLEN values. In addition, as the data indicate, the black ink containing sodium tetraphenylboride (Example IV) exhibited substantially improved intercolor bleed against the inks of Example II and Example III compared to the black ink containing no sodium tetraphenylboride (Comparative Example A).

EXAMPLE VI

A yellow ink composition is prepared by simple mixing of the following ingredients:

| Ingredient | Supplier | Amount (grams) |
|---|---|---|
| PROJET ® YELLOW OAM* dye | Zeneca | 29.8 |
| Soya amidopropylethyldimonium ethylsulfate** | Scher Chemical | 4.0 |
| 1,2-propanediol | Aldrich Chemical Co. | 10.0 |
| 1,4-bis(2-hydroxyethoxy)-2-butyne | Aldrich Chemical Co. | 10.0 |
| strontium chloride hexahydrate salt | Aldrich Chemical Co. | 5.0 |
| DOWICIL ® 200 biocide | Dow Chemical Co. | 0.25 |
| deionized water | — | 40.95 |

*containing 7.5 wt. % Acid Yellow 23 dye solids in water
**(Schercoquat, SOAS, M. Wt. = 520)

It is believed that when this ink is used to print yellow and black images with inks according to Comparative Example A and Example IV, results will be observed similar to those obtained in Example V.

EXAMPLE VII

A yellow ink composition is prepared by simple mixing of the following ingredients:

| Ingredient | Supplier | Amount (grams) |
|---|---|---|
| PROJET ® YELLOW OAM* dye | Zeneca | 28 |
| deionized water | — | 41.0 |
| sulfolane** | Phillips 66 | 15.0 |
| cesium chloride | Aldrich Chemical Co. | 10.0 |
| butyl carbitol | Van Waters & Rogers | 12.0 |
| acetylethanolamine*** | Scher Chemical | 6.0 |

*containing 7.5 wt. % Acid Yellow 23 dye solids in water
**95 wt. % sulfolane, 5 wt. % water
***75 wt. % acetylethanolamine, 25 wt. % water It is believed that when this ink is used to print yellow and black images with inks according to Comparative Example A and Example IV, results will be observed similar to those obtained in Example V.

EXAMPLE VIII

A yellow ink composition according to the present invention is prepared by simple mixing of the following ingredients:

| Ingredient | Supplier | Amount (grams) |
|---|---|---|
| PROJET ® YELLOW OAM* dye | Zeneca | 28 |
| deionized water | — | 24.885 |
| sulfolane** | Phillips 66 | 15.0 |
| tetraphenyl boron sodium | Aldrich Chemical Co. | 3.0 |
| butyl carbitol | Van Waters & Rogers | 12.0 |
| acetylethanolamine*** | Scher Chemical | 16.0 |
| imidazole | BASF | 1.0 |
| EDTA | Dow Chemical Co. | 0.065 |
| CRISANOL E2000 polyethylene oxide | Clariant Chemical | 0.05 |

*containing 7.5 wt. % Acid Yellow 23 dye solids in water
**95 wt. % sulfolane, 5 wt. % water
***75 wt. % acetylethanolamine, 25 wt. % water It is believed that when this ink is used to print yellow and black images with black inks according to Comparative Example A, improved intercolor bleed will be observed compared to yellow inks of similar composition but containing no sodium tetraphenylboride.

EXAMPLE IX

A black ink composition is prepared by simple mixing of the following ingredients:

| Ingredient | Supplier | Amount (grams) |
|---|---|---|
| CABOT ® IJX-307B2 carbon black dispersion | Cabot Corp. | 22.1 |
| sulfolane* | Phillips 66 | 12.63 |
| 2-pyrrolidinone** | Aldrich Chemical Co. | 8.42 |
| poly(dimethyldiallyammonium chloride) (CALGON CP 1030) | Calgon Corp. | 6.6 |
| SILWET ® L-7200 | Witco Corp. | 0.60 |
| deionized water | — | 49.65 |

*95 wt. % sulfolane, 5 wt. % water
**95 wt. % 2-pyrrolidinone, 5 wt. % water

It is believed that when this ink is used to print yellow and black images with yellow inks according to Example VIII, improved intercolor bleed will be observed compared to yellow inks of similar composition but containing no sodium tetraphenylboride.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A set of inks for printing multicolor Images in an ink jet printer, said ink set comprising (1) a first ink having a first color and comprising water, a first colorant which is an anionic dye, and at least one of (a) a cationic polymer, (b) a cationic surfactant, or (c) an inorganic salt the cation of which has a tetraphenylboride salt that is substantially insoluble in water; and (2) a second ink having a second color different from the first color and comprising water, a second colorant, and sodium tetraphenylboride, wherein intercolor bleed beiween the first ink and the second ink is reduced when the second ink is printed adjacent to, on top of, or underneath the first ink on a print substrate.

2. An ink set according to claim 1 wherein the sodium tetraphenylboride is present in the second ink in an amount of at least about 0.1 percent by weight of the ink, and wherein the sodium tetraphenylboride is present in the ink in an amount of no more than about 10 percent by weight of the ink.

3. An ink set according to claim 1 wherein the first ink contains a cationic polymer.

4. An ink set according to claim 3 wherein the cationic polymer is a polyquaternary amine compound of the general formulae

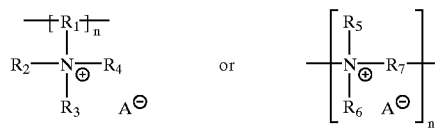

wherein n is an integer representing the number of repeat monomer units, $R_1$ and $R_7$ each, independently of the other, is an alkylene group, an arylene group, an arylalkylene group, or an alkylarylene group, and $R_2$, $R_3$, $R_4$, $R_5$, and $R_6$ each, independently of the others, are hydrogen atoms, alkyl groups, aryl groups, arylalkyl groups, or alkylaryl groups.

5. An ink set according to claim 3 wherein the cationic polymer is selected from the group consisting of polydiallyl ammonium compounds, polyquaternized polyvinylamines, polyquaternized polyal lylamines, epichlorohydrin/amine copolymers, cationic amido amine copolymers, copolymers of vinyl pyrrolidinone and a vinyl imidazolium salt, and mixtures thereof.

6. An Ink set according to claim 3 wherein the cationic polymer is present in the ink in an amount of at least about 0.01 percent by weight of the first ink and wherein the cationic polymer is present in the ink in an amount of no more than about 25 percent by weight of the first ink.

7. An ink set according to claim 3 wherein the first ink contains an inorganic salt the cation of which has a tetraphenylboride salt that is substantially insoluble in water.

8. A set of inks according to claim 7 wherein the inorganic salt has a cation selected from the group consisting of tetramethylammonium, tetraethylammonium, tetrabutylammonium, pyridimium, N-methyl pyridimium, $K^+$, $Rb^+$, $CS^+$, $Ca^{2+}$, $Sr^{2+}$, $Ba_{2+}$, $La^{3+}$, $Zn^{2+}$, $Al^{3+}$, $Eu^{3+}$, $Gd^{3+}$, and mixtures thereof.

9. An ink set according to claim 7 wherein the inorganic salt is selected from the grup consisting of tetramethyl ammonium chloride, tetraethyl ammonium chloride, tetrabutyl ammonium chloride, pyridinium chloride, N-methyl pyridinium chloride, potassium chloride, rubidium chloride, cesium chloride, magnesium chloride, strontium chloride, barium chloride, zinc chloride, aluminum nitrate, europium chloride, gadolinium chloride, and mixtures thereof.

10. An ink set according to claim 7 wherein the inorganic salt is present in the first ink in an amount of at least about 0.1 percent by weight of the ink, and wherein the inorganic salt is present in the first ink in an amount of no more than about 15 percent by weight of the ink.

11. An ink set according to claim 7 wherein the first ink comprises water and a colorant comprising an anionic dye complexed with a polyquatemary amine compound.

12. An ink set according to claim 1 wherein the first ink contains a cationic surfactant.

13. An ink set according to claim 12 wherein the cationic surfactant is selected from the group consisting of octyl trimethyl ammonium chloride; tridecyloxypropyl dihydroxy ethyl methyl ammonium chloride; methyl bis(2-hydroxy ethyl)coco ammonium chloride; (2-(2-carboxy ethoxy) ethyl) 2-(2-hydroxy)ethoxy)ethyl) methyl dodecyl ammonium methyl sulfate; (2-(2-carboxy ethoxy)ethyl) (2-(2-hydroxy)ethoxy ethyl)methyl octadecyl ammonium methyl sulfate; N-tetradecyl dlmethyl-naphthyl methyl ammonium chloride; octadecyl diethanol methyl ammonium chloride; octadecyl dihydroxy ethyl methyl ammonium chloride; bis ((ethyl tallowate))-2-hydroxyethyl methyl ammonium methyl sulfate; ditallow amido ammonium methyl sulfate; bis hydroxyethyl dihydroxypropyl stearaminium chloride; methyl bis(oleyl amido ethyl)2-hydroxyethyl ammonlum methyl sulfate; methyl bis(soya amido ethyl)2-hydroxyethyl ammonium methyl sulfate; methyl bis(tallow amido ethyl) 2-hydroxy propylammonium methyl sulfate; and mixtures thereof.

14. An ink set according to claim 12 wherein the cationic surfactant is present in the first ink in an amount of at least about 1 percent by weight of the ink and wherein the cationic surfactant is present in the first ink in an amount of no more than about 15 percent by weight of the ink.

15. An ink set according to claim 12 wherein the first ink comprises water and a colorant comprising an anionic dye complexed with a polyquaternary amine compound.

16. A set of inks for printing multicolor images in an ink jet printer, said ink set comprising (1) a first ink having a first color and comprising water, a first colorant, and a cationic polymer which is a polydiallyl dimethyl ammonium compound; and (2) a second ink having a second color different from the first color and comprising water a second colorant, and sodium tetrophenylboride, wherein intercolor bleed between the first ink and the second ink is reduced when the second ink is printed adjacent to, on top of, or underneath the first ink on a print substrate.

17. A set of inks for printing multicolor images in an ink iet printer, said ink set comprising (1) a first ink having a first color and comprising water, a first colorant which is an anionic dye, and a cationic polymer; and (2) a second ink having a second color different from the first color and comprising water, a second colorant, and sodium tetraphenylboride, wherein intercolor bleed between the first ink and the second ink is reduced when the second ink is printed adjacent to, on top of, or underneath the first ink on a print substrate.

18. A set of inks for printing multicolor images in an ink jet printer, said ink set comprising (1) a first ink having a first color and comprising water and a colorant comprising and anionic dye complesed with a polyquarternary amine compound; and (2) a second ink having a second color different from the first color and comprising water, a second colorant, and sodium tetraphenylboride, wherein intercolor bleed between the first ink and the second ink is reduced when the second ink is printed adjacent to, on top of, or underneath the first ink on a print substrate.

19. A set of inks for printing multicolor images in an ink jet printer, said ink set comprising (1) a first ink having a first color and comorisina water, a first colorant which is an anionic dye, and a cationic surfacant; and (2) a second ink having a second color different from the first color and comprising water, a second colorant, and sodium tetraphenylboride, wherein intercolor bleed between the first ink and the second ink is reduced when the second ink is printed adjacent to, on top of, or underneath the first ink on a print substrate.

20. A multicolor ink jet printing process which comprises (1) incorporating into an ink jet printer a first ink having a first color and comprising water, a first colorant, which is an anionic dye, and at least one of (a) a cationic polymer, (b) a cationic surfactant, or (c) an inorganic salt the cation of which has a tetraphenylboride salt that is substantially insoluble in water; (2) incorporating into the ink jet printer a second ink having a second color different from the first color and comprising water, a second colorant, and sodium tetraphenylboride; (3) causing droplets of the first ink to be ejected in a imagewise pattern onto a substrate; and (4) causing droplets of the second ink to be ejected in an imagewise pattern onto the substrate, wherein intercolor bleed between the first ink and the second ink is reduced when the second ink is printed adjacent to, on top of, or underneath the first ink on the substrate.

21. A printing process according to claim 20 wherein the printer employs a thermal ink jet process wherein the ink in the nozzles is slectively heated in an imagewise patern, thereby causing droplets of the ink to be ejected in imagewise pattern.

* * * * *